(12) United States Patent
Lachmund et al.

(10) Patent No.: US 9,873,331 B2
(45) Date of Patent: Jan. 23, 2018

(54) METHOD FOR DEACTIVATING A HIGH VOLTAGE SYSTEM OF A MOTOR VEHICLE

(71) Applicant: VOLKSWAGEN AG, Wolfsburg (DE)

(72) Inventors: Uwe Lachmund, Wolfsburg (DE); Ronny Hänsch, Rötgesbüttel (DE); Stefan Quentmeier, Braunschweig (DE)

(73) Assignee: Volkwagen AG, Wolfsburg (DE)

( * ) Notice: Subject to any disclaimer, the term of this patent is extended or adjusted under 35 U.S.C. 154(b) by 359 days.

(21) Appl. No.: 14/417,400

(22) PCT Filed: Jun. 19, 2013

(86) PCT No.: PCT/EP2013/062724
§ 371 (c)(1),
(2) Date: Jan. 26, 2015

(87) PCT Pub. No.: WO2014/019760
PCT Pub. Date: Feb. 6, 2014

(65) Prior Publication Data
US 2015/0210165 A1    Jul. 30, 2015

(30) Foreign Application Priority Data

Jul. 28, 2012   (DE) .................. 10 2012 015 059

(51) Int. Cl.
*B60L 3/04* (2006.01)
*B60L 3/00* (2006.01)
*B60L 11/18* (2006.01)

(52) U.S. Cl.
CPC ........... *B60L 3/0092* (2013.01); *B60L 3/0046* (2013.01); *B60L 3/04* (2013.01); *B60L 11/1816* (2013.01);
(Continued)

(58) Field of Classification Search
CPC ........ B60L 3/0092; B60L 3/0046; B60L 3/04; B60L 11/1816; B60L 11/1868;
(Continued)

(56) References Cited

U.S. PATENT DOCUMENTS

| 5,565,711 A | 10/1996 | Hagiwara |
| 5,793,121 A | 8/1998 | Burgess |

(Continued)

FOREIGN PATENT DOCUMENTS

| CN | 2757399 Y | 2/2006 |
| CN | 101544215 A | 9/2009 |

(Continued)

OTHER PUBLICATIONS

Search Report for German Patent Application No. 10 2012 015 059.8; dated Mar. 25, 2013.

(Continued)

*Primary Examiner* — Hal Kaplan
(74) *Attorney, Agent, or Firm* — Barnes & Thornburg LLP

(57) ABSTRACT

A method for deactivating an electric high voltage system of a motor vehicle including requesting an interruption of the high voltage system in a first control system; requesting an interruption of the high voltage system in a second control system; and the automatic interruption of the high voltage system by at least one of the control systems.

18 Claims, 5 Drawing Sheets

(52) U.S. Cl.
CPC ....... *B60L 11/1868* (2013.01); *B60L 2250/16* (2013.01); *Y02T 10/7005* (2013.01); *Y02T 10/7066* (2013.01); *Y02T 10/7072* (2013.01); *Y02T 90/14* (2013.01)

(58) Field of Classification Search
CPC ............. B60L 2250/16; Y02T 10/7066; Y02T 10/7072; Y02T 90/14; Y02T 90/34
USPC .................................................. 307/9.1, 10.1
See application file for complete search history.

(56) References Cited

U.S. PATENT DOCUMENTS

| | | |
|---|---|---|
| 2007/0152432 A1 | 7/2007 | Uchida |
| 2007/0222413 A1 | 9/2007 | Kinoshita et al. |
| 2011/0288700 A1* | 11/2011 | Pebbles ..................... B60L 3/04 701/22 |

FOREIGN PATENT DOCUMENTS

| | | | |
|---|---|---|---|
| CN | 102390279 | A | 3/2012 |
| CN | 102514495 | A | 6/2012 |
| DE | 19710416 | A1 | 9/1998 |
| DE | 102010055922 | A1 | 6/2012 |
| JP | H05-153799 | * | 6/1993 |
| JP | H07170602 | A | 7/1995 |
| KR | 20070026702 | A | 3/2007 |
| WO | 2006022061 | A1 | 3/2006 |

OTHER PUBLICATIONS

Search Report for International Patent Application No. PCT/EP2013/062724; dated Mar. 19, 2014.
Chinese Search Report for Corresponding Chinese Application No. 201380040252.0 dated Apr. 26, 2016.
Korean Office Action for Korean Application No. 10-2015-7004088 dated Apr. 19, 2016.
Search Report for Chinese Patent Application No. 201380040252.0; dated Dec. 23, 2016.
Office Action and Search Report for Chinese Patent Application No. 201380040252.0; dated Aug. 27, 2017.

* cited by examiner

METHOD FOR DEACTIVATING A HIGH VOLTAGE SYSTEM OF A MOTOR VEHICLE

PRIORITY CLAIM

This patent application is a U.S. National Phase of International Patent Application No. PCT/EP2013/062724, filed 19 Jun. 2013, which claims priority to German Patent Application No. 10 2012 015 059.8, filed 28 Jul. 2012, the disclosures of which are incorporated herein by reference in their entirety.

SUMMARY

Illustrative embodiments provide a method for deactivating and reactivating a high voltage system of a motor vehicle. In particular, illustrative embodiments make maintenance of a high voltage system in a motor vehicle simpler and/or safer.

Illustrative embodiments are based on the concept of making maintenance of a high voltage system in a motor vehicle simpler and also safer by reducing the manual actions that need to be performed in the course of deactivation and reactivation and, alternatively, by replacing manual actions with automated method operations. To achieve adequate process reliability in this case, provision is also made for the automated process operations to be performed redundantly where required or appropriate.

BRIEF DESCRIPTION OF THE DRAWINGS

The present disclosure is explained in more detail below with reference to an illustrative embodiment that is presented in the drawings, in which.

DETAILED DESCRIPTION OF THE DISCLOSED EMBODIMENTS

Figure 1:
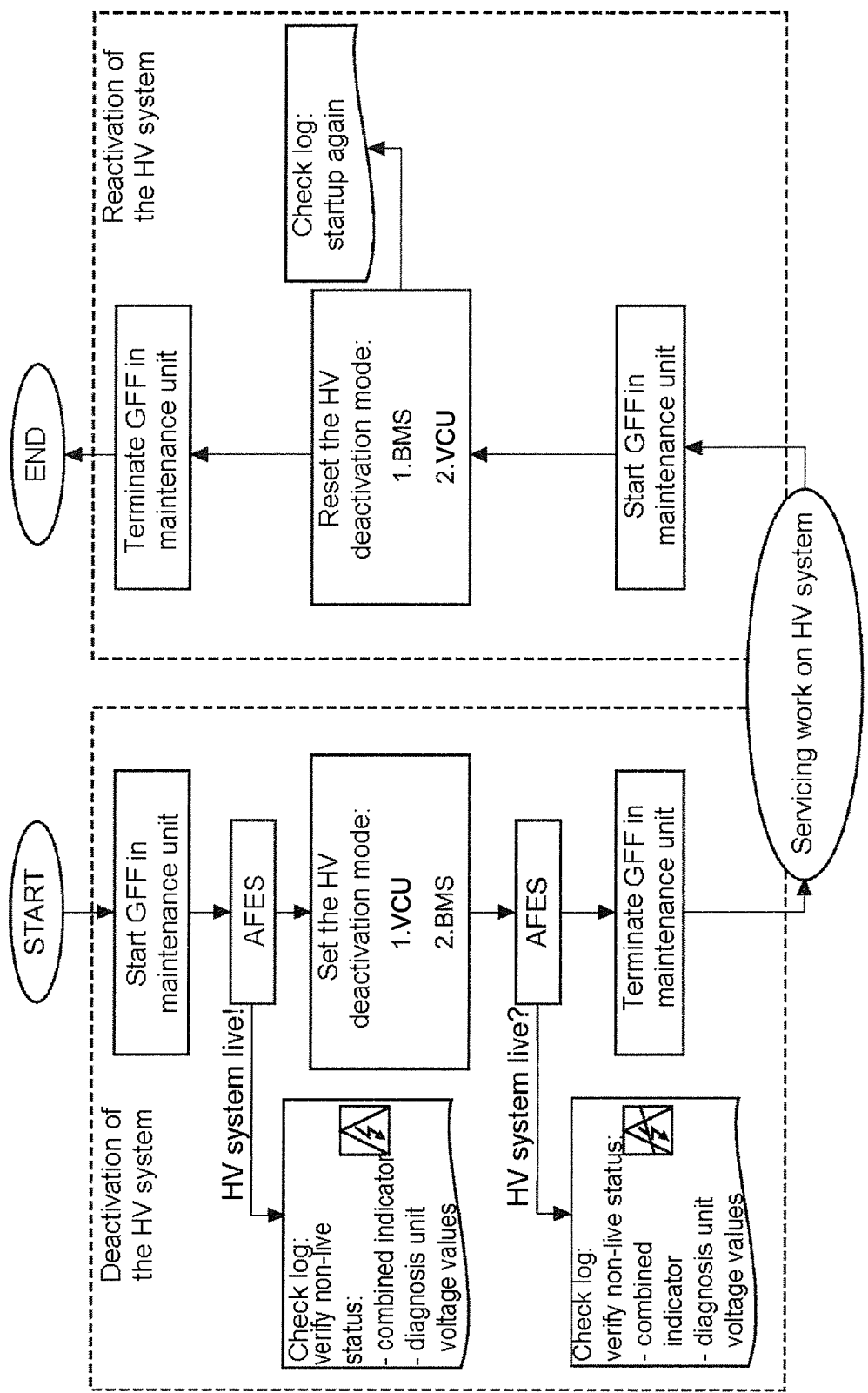
FIG. 1 shows a diagram presenting a disclosed embodiment of features of the method.

In the broadest sense, the illustrative embodiments relate to a method for deactivating an electric high voltage system of a motor vehicle, having the operations of:

(optionally manual) request for interruption of the high voltage system on a first control system 100;
(optionally manual) request for interruption of the high voltage system on a second control system 102; and
automatic interruption of the high voltage system by at least one of the control systems 104.

According to the present disclosure, "high voltage" is understood to mean an electrical voltage that is ≥60 V in the case of DC voltage and/or ≥30 V in the case of AC voltage and, in particular, may also be distinctly above that, for example 300 V or 400 V.

According to the present disclosure, "non-live status" is understood to mean an electrical voltage that is ≥25 V and particularly ≥20 V in the case of DC voltage and/or ≥30 V in the case of AC voltage and optionally 0 V (in the case of DC and AC voltage).

To increase safety, provision may be made for the automatic interruption of the high voltage system to be followed by determination of the non-live status of the high voltage system 106. This can be effected by one or more measuring devices 12, which may be integrated inside the vehicle and particularly in one or both of the controllers. In this case, provision may be made for the non-live status to be automatically logged. In addition, provision may be made for the non-live status, i.e. a voltage between two defined measurement points that is ≤25 V, to be displayed on at least one output apparatus, so that the non-live status can additionally be checked manually if need be and logged if need be.

In a further disclosed embodiment of the method, provision may additionally be made for the automatic interruption to be preceded by determination of the presence of high voltage on the high voltage system 108. This allows the operability of both the high voltage system and the measuring devices to be checked in advance.

Optionally, the non-live status and/or the presence of high voltage is determined by at least two independent measuring devices so as to achieve an increase in process reliability by means of redundancy in this case too. Optionally, the two measuring devices are integrated in the (at least) two control systems.

Optionally, provision may be made for the automatic interruption of the high voltage system to be requested manually by the control system. The maintenance personnel is therefore able to influence the instant at which automatic voltage disconnection is meant to take place. In this case, provision may be made for the manual request to be actually possible only under certain prerequisites. By way of example, in the course of guided troubleshooting, as carried out by means of maintenance units in the course of maintenance, a manual request for automatic interruption may be possible only at a particular instant, within a defined period or on the basis of the accomplishment of preceding maintenance operations.

An additional increase in the safety of the method can be achieved by virtue of the two requests for automatic interruption of the high voltage system needing to be made within a defined period (e.g. within 30 seconds) to lead to automatic interruption of the high voltage system.

Illustrative embodiments also relate to a method for reactivating a high voltage system deactivated, having at least the following method operations:

first request for conclusion of the interruption of the high voltage system on the first or second control system;
second request for conclusion of the interruption of the high voltage system on the first or second control system; and
automatic conclusion of the interruption of the high voltage system by the control systems.

In this case, provision may be made for the first and/or second request to require the input of a code that has been produced during the deactivation to lead to automatic conclusion of the interruption of the high voltage system.

To increase safety, the reactivation of the high voltage system may also have provision for the second request for conclusion of the interruption of the high voltage system to need to be made within a defined period (e.g. 30 seconds) after the first request to lead to the automatic conclusion of the interruption of the high voltage system.

In another disclosed embodiment of the method, provision may then be made for the code to be output on a maintenance unit, which is temporarily connected to the control systems, when the high voltage system is deactivated and to be input into the maintenance unit and transmitted therefrom to the controller(s) if need be when the high voltage system is reactivated. In particular, the maintenance unit may be one that is today regularly used in the course of software-guided troubleshooting for servicing motor vehicles.

A further increase in safety for the method can be attained if the maintenance unit permits reactivation of the high voltage system only on the basis of the maintenance state of the motor vehicle. Accordingly, the maintenance unit can automatically check a maintenance state of the motor vehicle, wherein the interruption of the high voltage system is concluded automatically on the basis of the maintenance state. In particular, in this case, provision may be made, for the input of the code for reactivation that is output during deactivation and/or the dual reactivation request to lead to actual automatic conclusion of the interruption of the high voltage system only if the maintenance unit has recognized termination of guided troubleshooting. Alternatively, provision may also be made for the input of the code with the aim of reactivating the high voltage system to be possible only if the maintenance unit has recognized termination of guided troubleshooting.

Figure 2:
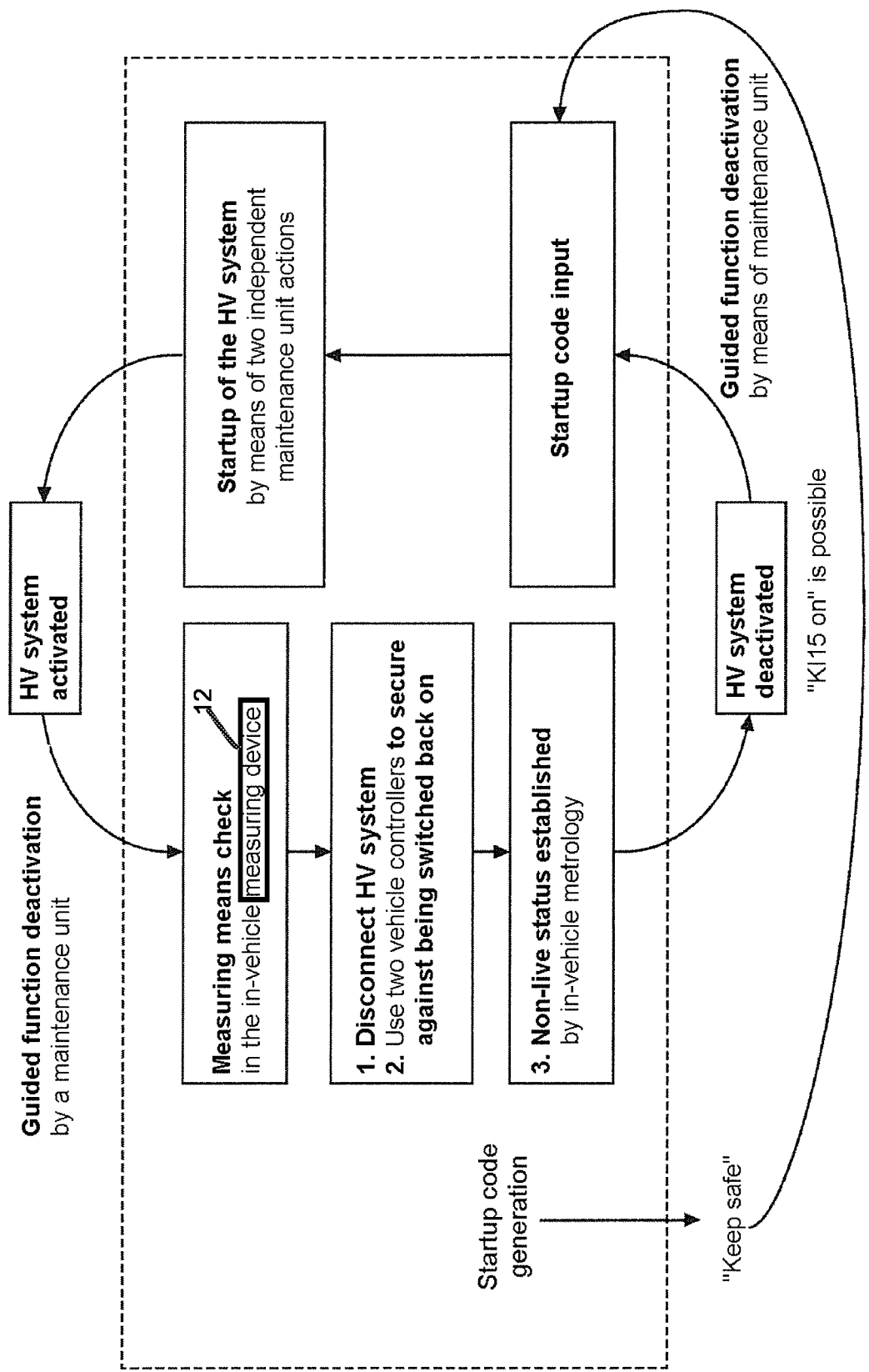
FIG. 2 shows a diagram presenting operations in the performance of the method shown in FIG. 1.

FIGS. 1 and 2 show diagrams presenting features and specific method operations pertaining to the deactivation and subsequent reactivation of a high voltage system ("HV" system) in a motor vehicle.

The high voltage system (not shown) is the traction network of an electrified motor vehicle. The motor vehicle comprises at least one high voltage source, such as particularly a high voltage battery unit or a fuel cell, and also one or more high voltage loads. These are particularly one or more electric drive motors, possibly an electric air conditioning compressor and other added-convenience devices and/or ancillary units operated at high voltage, power electronics for controlling the functional elements operated at high voltage and possibly a charging system that can be used to charge the high voltage battery unit from an external electric power source. In addition, the high voltage system comprises one or more contactors, which may be in electromechanical form, in particular, and can be actuated by at least two control systems of the motor vehicle to switch the high voltage system. On the basis of the actuation signal, the contactors are open, as a result of which they interrupt the high voltage system or at least one circuit thereof, or they are closed, as a result of which they do not influence, i.e. do not interrupt, the high voltage system.

The first of the control systems is an engine controller and the second control system is the battery management system of the motor vehicle. Both control systems are operated not at high voltage but rather at low voltage and to this end are integrated in a conventional onboard power supply system of the motor vehicle that is operated at 12 V, as is also known from conventional motor vehicles driven by just an internal combustion engine.

The high voltage system additionally also comprises at least one measuring device that allows qualitative (high voltage: yes/no) and/or quantitative (precise-value) measurement of the voltage present on the high voltage system.

The high voltage system is deactivated by first of all switching on the high voltage system, i.e. applying high voltage thereto ("KI15 on"). To this end, the motor vehicle or at least the high voltage system is put into the operating state by means of an "ignition key" or another starting device. An external maintenance unit is then connected to a port, provided for the purpose, that is connected to the two control systems, and what is known as "guided troubleshooting" (GFF) is started in the maintenance unit by the personnel performing the maintenance. During guided troubleshooting, the maintenance unit outputs specific maintenance operations. In this case, it is also possible for the maintenance personnel to interact with the maintenance unit.

The start of the guided troubleshooting in the maintenance unit initiates the measuring means check. The result of the voltage check effected in the process (Automatisches Feststellen der Spannungsfreiheit; "AFES": which means "automatic detection of non-live status") is firstly indicated on the maintenance unit by the high voltage that is specifically present at the measurement points tapped off by the measuring device, i.e. quantitatively; secondly, there is an indication in a display ("combined instrument") in the instruments of the motor vehicle, the indication being merely qualitative, i.e. a "lightning" symbol indicates whether or not high voltage is present. The result of the measuring means check is logged for verification purposes. This can be done automatically or manually by the maintenance personnel.

If high voltage is present (the two indicators match; normal situation), the maintenance unit can be used to manually request the automatic interruption of the high voltage system ("Set HV deactivation mode"). To this end, the maintenance unit can also request in the course of guided troubleshooting. The HV deactivation mode is set by two manual requests that are made by the maintenance personnel at a defined interval of time, the first request being sent to the HV coordinator of the engine controller ("VCU") and the second request being sent to the battery management system ("BMS"). Only if the second request has been input into the maintenance unit within a defined period (e.g. 30 seconds) after the first request is the high voltage system actually interrupted by virtue of both control systems opening the contactors of the high voltage system ("Disconnect HV system").

A significant safety aspect in the case of the method is that the high voltage system is secured against being unintentionally or abusively switched back on after automatic interruption. This is accomplished by generation of a startup code by at least one of the control systems, which is transmitted therefrom to the maintenance unit and output thereon, i.e. indicated temporarily or permanently, in particular, or output in another way. Alternatively, the startup code can also be generated by the maintenance unit itself, however. Following output of the startup code, the control systems lock, so that the high voltage system can be reactivated, i.e. switched back on, again only when the startup code is input into the maintenance unit again. In this case, an additional condition defined for the reactivation may be that all operations of the guided troubleshooting by the maintenance unit have been concluded.

First of all, however, the non-live status of the high voltage system is established as being positive, non-live status in this case being understood to mean a voltage of <20 V (DC voltage). This is in turn effected by the measuring device, with the result thereof again being presented on the maintenance unit (quantitatively) and on the combined instrument (qualitatively), so that the maintenance personnel can or needs to establish the match therein manually (visually). In addition, there may be provision for automatic or manual logging of the result in the check log.

The guided troubleshooting on the maintenance unit can then be terminated and the actual maintenance work on the high voltage system performed. Alternatively, the maintenance work may also be part of the guided troubleshooting, however.

Following termination of the maintenance work, the high voltage system can be reactivated again. To this end, guided troubleshooting is again started (alternative: the reactivation also takes place—like the deactivation and the maintenance work—in a single instance of guided troubleshooting). The manual request for reactivation is then made by means of the maintenance unit ("Reset the HV deactivation mode"), and this in turn requires two manual requests that are again made for the two control systems (reverse order from the deactivation) at a defined interval of time. This requires input of the startup code generated during the deactivation at least once. The control systems then automatically close the contactors, which reverses, i.e. concludes, the interruption of the high voltage system that took place during the deactivation. Startup of the high voltage system again, as has taken place in this fashion, is in turn logged in the check log, and then the guided troubleshooting in the maintenance unit is terminated.

In motor vehicles with an electrified or partially electrified drive train (BEV: battery electric vehicle; HEV: hybrid electric vehicle; PHEV: plug-in hybrid electric vehicle), the electric drive motor and other components, such as particularly an electrically driven air-conditioning compressor, are operated at a comparatively high electrical voltage of in some cases several hundred volts. The components operated at high voltage, together with the high voltage source and further elements (e.g. power electronics, charger), form a high voltage system, which is also called a traction network. Besides the traction network, electrified motor vehicles regularly also have a second electrical system that corresponds to the onboard power supply system of a conventional motor vehicle and is therefore operated at relatively low voltage (particularly 12 V or 24 V).

In customer service, the traction network needs to be deactivated before working thereon to prevent the service personnel from being endangered as a result of touching portions of the traction network that are at high voltage. Such deactivation takes place in three stages: first, the traction network is made non-live, then the traction network is secured against being unintentionally or abusively switched back on, and finally the non-live status is established as still positive.

At present, non-live status is produced firstly by means of what is known as "high voltage service disconnect" (HV-SD), which is basically a connector that interrupts the traction network directly, for example by manually removing a jumper or a fuse in the traction network. In addition, what is known as a "low voltage service disconnect" (LV-SD) may also be provided, which opens a contactor in the traction network as a result of direct interruption of its power supply.

The known methods involve the traction network being secured against being switched on again in a simple manner by virtue of the HV-SD being locked away or the LV-SD being locked. In addition, provision may be made for the HV-SD and/or the LV-SD to be replaced by lockable lockups (what are known as "dummies"), so that the SDs that have been rendered inaccessible cannot be replaced by others.

Establishment of non-live status as the third and final stage of the three-stage deactivation process is effected by means of voltage measurement at stipulated measurement points.

If the traction network needs to be reactivated, the HV-SD or the LV-SD is reinstated.

Figure 3:
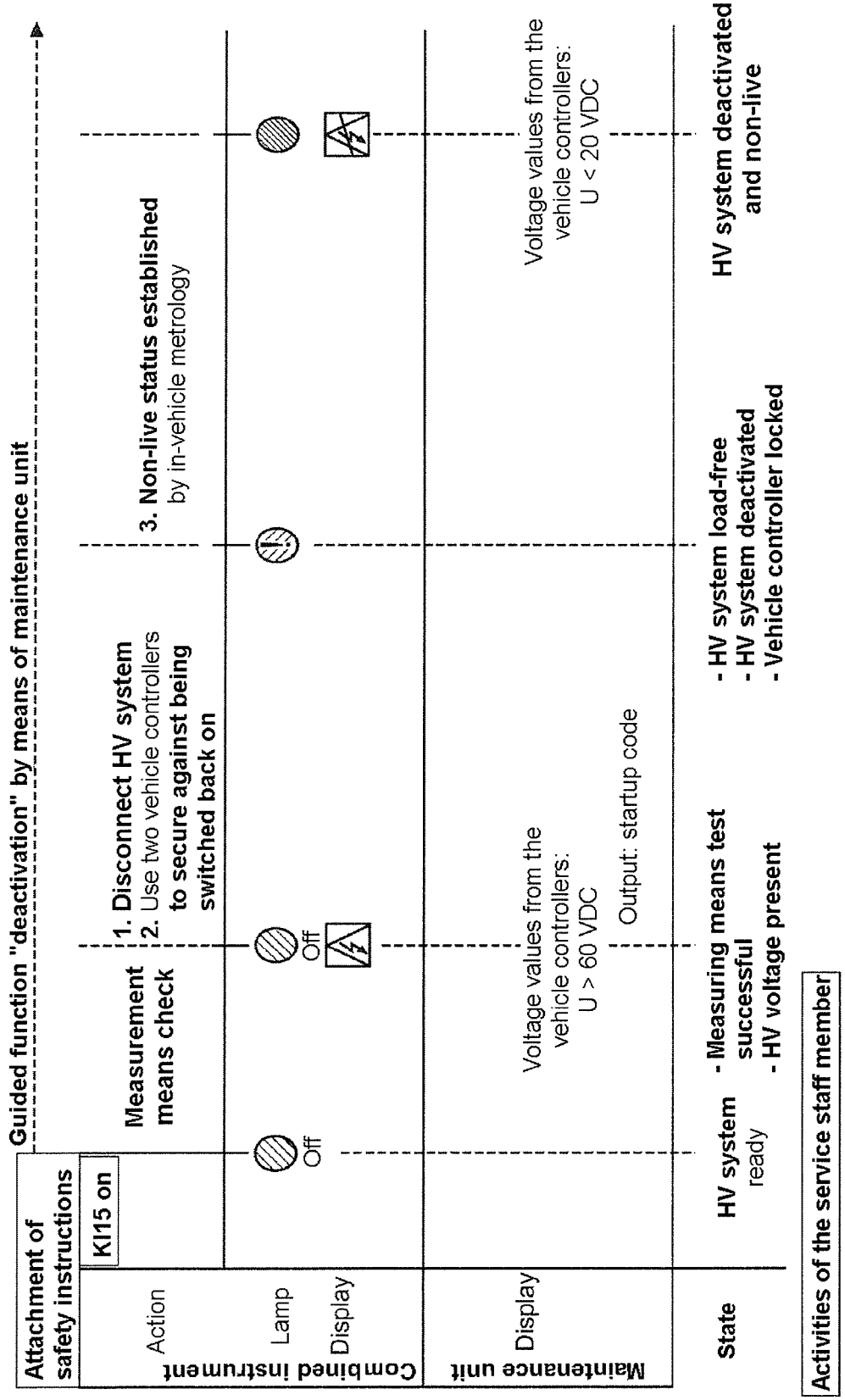
FIG. 3 shows the visual feedback when the high voltage system is deactivated in the course of the method shown in FIGS. 1 and 2.
Figure 4:
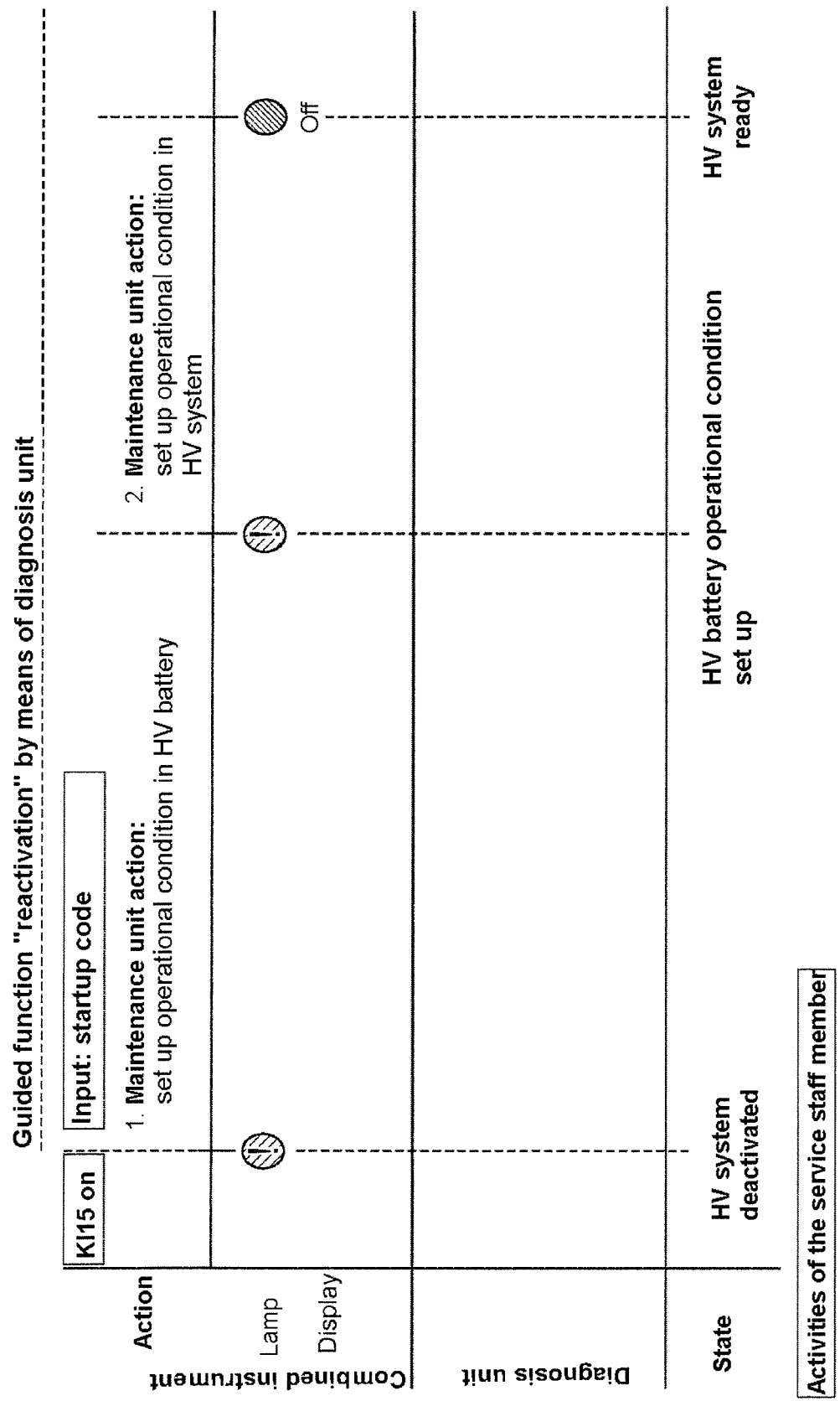
FIG. 4 shows the visual feedback when the high voltage system is reactivated in the course of the method shown in FIGS. 1 and 2.
Figure 5:
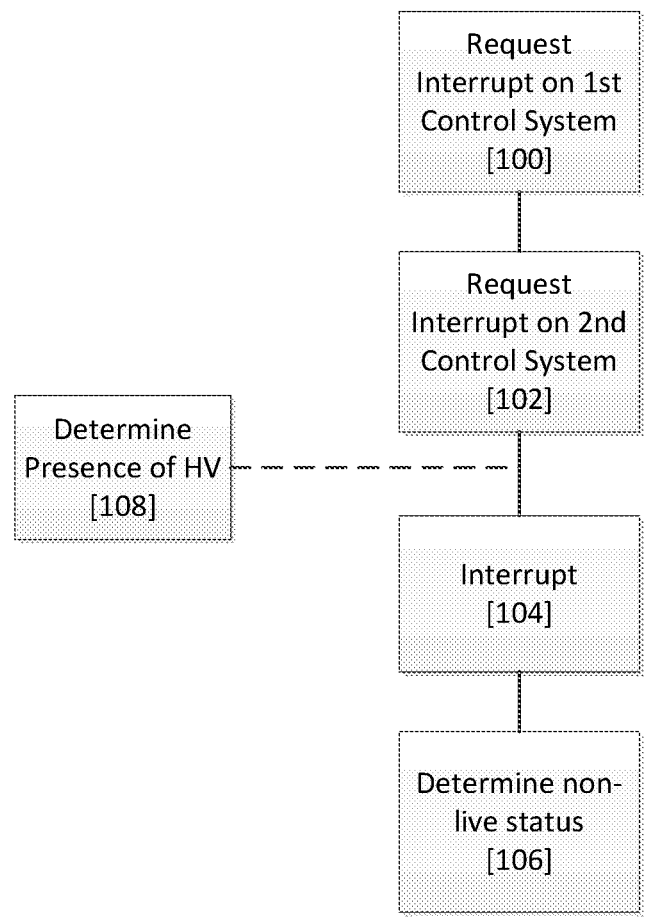
FIG. 5 shows an exemplary flowchart of steps of the method of FIGS. 1 and 2.

The known method for deactivating and reactivating a traction network in a motor vehicle has the disadvantage that it is not really safe. As shown in FIG. 3, an illustrative example of visual feedback when the high voltage system is deactivated according to the methods shown in FIGS. 1 and 2 including lamp displays. As shown in FIG. 4, an illustrative example of visual feedback when the high voltage system is reactivated according to the methods shown in FIGS. 1 and 2 including lamp displays.

Although the actions of "removing the service disconnect" and "replacing the service disconnect" with a dummy are regularly part of prescribed process stages in customer service that need to be logged by the maintenance personnel, there are no measures ensuring that the traction network is reactivated only when there is an instruction to do so in the course of the guided troubleshooting. Replacement of a dummy by the corresponding service disconnect results immediately in reactivation of the traction network in the case of the known systems. Should this be effected negligently or else deliberately too early, i.e. before contact safety has been established completely, any person working on the vehicle is in danger of suffering a possibly fatal electric shock.

DE 197 10 416 A1 discloses a high voltage plug connector that is intended for use when a high voltage source is electrically connected to the components powered thereby, such as particularly an electric drive motor, in an electrified motor vehicle. The high voltage plug connector has not only contact elements to which high voltage is applied during operation of the traction network but additionally also a monitoring switch that is connected to a control unit. Operation of the monitoring switch, as occurs when the plug connector is detached from a complementary mating plug connector, results in deactivation of the high voltage source by the control unit. This is intended to prevent high voltage from continuing to be applied to the then freely accessible contacts of the plug connector.

The invention claimed is:

1. A method for deactivating an electrical high voltage system in a motor vehicle, the method comprising:
    requesting interruption of the high voltage system on a first control system;
    requesting interruption of the high voltage system on a second control system; and
    automatically interrupting the high voltage system by at least one of the control systems, and
    determining a non-live status of the high voltage system after the automatic interruption.

2. The method of claim 1, further comprising determining the presence of high voltage on the high voltage system prior to interrupting the high voltage system.

3. The method of claim 1, wherein the non-live status and/or a presence of high voltage is determined by at least two measuring devices.

4. The method of claim 1, wherein the requesting interruption of the high voltage system of at least one of the first and second control systems is made manually.

5. The method of claim 1, wherein the requesting interruption on the second control system must be made within a defined period after the requesting interruption on the first control system in order to permit the automatically interrupting of the high voltage system.

6. The method of claim 1 further comprising reactivating the high voltage system: the reactivating comprising:
    requesting, as a first request, conclusion of the interruption of the high voltage system on at least one of the first and second control system;

requesting, as a second request, conclusion of the interruption of the high voltage system on at least one of the first and second control system; and automatically concluding the interruption of the high voltage system by the control systems.

7. The method of claim 6, wherein the first and/or second request requires input of a code that has been produced during the deactivation in order to permit the automatically concluding the interruption of the high voltage system.

8. The method of claim 7 wherein the second request must be made within a defined period after the first request in order to permit the automatically concluding the interruption of the high voltage system.

9. The method of claim 8, wherein the code is output on a maintenance unit, configured to be temporarily connected to the control systems, when the high voltage system is deactivated and is input into the maintenance unit when the high voltage system is reactivated.

10. The method of claim 9, wherein the maintenance unit checks a maintenance state, wherein the interruption of the high voltage system is concluded automatically only when a defined maintenance state is present.

11. A method for deactivating an electrical high voltage system in a motor vehicle, the method comprising:
   requesting interruption of the high voltage system, as a first interruption request, on a first control system;
   requesting interruption of the high voltage system, as a second interruption request, on a second control system; and
   automatically interrupting the high voltage system by at least one of the control systems, in response to the second interruption request being made within a defined period after the first interruption request.

12. The method of claim 11, further comprising determining the presence of high voltage on the high voltage system prior to interrupting the high voltage system.

13. The method of claim 12, wherein the presence of high voltage is determined by at least two measuring devices.

14. The method of claim 11, wherein at least one of the first and second interruptions requests is made manually.

15. The method of claim 11, further comprising reactivating the high voltage system: the reactivating comprising:
   requesting, as a first reactivation request, conclusion of interruption of the high voltage system on at least one of the first and second control system;
   requesting, as a second reactivation request, conclusion of interruption of the high voltage system on at least one of the first and second control system; and
   automatically concluding the interruption of the high voltage system by the control systems.

16. The method of claim 15, wherein the first and/or second reactivation request requires input of a code produced during the deactivation in order to permit the automatically concluding of the interruption of the high voltage system.

17. A method for reactivating a high voltage system that has undergone deactivation by requesting interruption of the high voltage system on a first control system, requesting interruption of the high voltage system on a second control system, automatically interrupting the high voltage system by at least one of the control systems, and determining a non-live status of the high voltage system after the automatic interruption; the method for reactivating comprising:
   requesting, as a first request, conclusion of interruption of the high voltage system on at least one of a first control system and a second control system;
   requesting, as a second request, conclusion of the interruption of the high voltage system on at least one of the first and second control systems; and
   automatically concluding the interruption of the high voltage system by the control systems.

18. The method of claim 17, wherein the first and/or second request requires input of a code produced during the deactivation in order to permit the automatically concluding of the interruption of the high voltage system.

* * * * *